(12) United States Patent
Paul et al.

(10) Patent No.: US 7,240,843 B2
(45) Date of Patent: Jul. 10, 2007

(54) UNIVERSAL CLUB CARD AND REAL-TIME COUPON VALIDATION

(75) Inventors: Charles Frederic Paul, Incline Village, NV (US); Vijay R. Chetty, Santa Monica, CA (US)

(73) Assignee: Lobar Code Technologies, Inc., Los Angeles, CA (US)

( * ) Notice: Subject to any disclaimer, the term of this patent is extended or adjusted under 35 U.S.C. 154(b) by 0 days.

(21) Appl. No.: 10/614,733

(22) Filed: Jul. 2, 2003

(65) Prior Publication Data
US 2004/0140361 A1    Jul. 22, 2004

Related U.S. Application Data

(60) Provisional application No. 60/461,493, filed on Apr. 7, 2003, provisional application No. 60/442,133, filed on Jan. 22, 2003.

(51) Int. Cl.
*G06K 7/10* (2006.01)
(52) U.S. Cl. .................. 235/472.01; 235/462.45; 235/383
(58) Field of Classification Search ........... 235/472.01, 235/472.02, 472.03, 462.45, 462.46, 383, 235/385
See application file for complete search history.

(56) References Cited

U.S. PATENT DOCUMENTS

| | | | |
|---|---|---|---|
| 3,959,624 A | 5/1976 | Kaslow | |
| 4,540,880 A | 9/1985 | Hipko | |
| 5,025,139 A | 6/1991 | Halliburton, Jr. | |
| 5,128,520 A | 7/1992 | Rando et al. | |
| 5,152,387 A | 10/1992 | Hammond | |
| 5,161,661 A | 11/1992 | Hammond | |
| 5,185,695 A | 2/1993 | Pruchnicki | |
| 5,192,854 A | 3/1993 | Counts | |
| 5,208,445 A | 5/1993 | Nahar et al. | |
| 5,361,913 A | 11/1994 | Melchionna | |
| 5,424,524 A | 6/1995 | Ruppert et al. | |
| RE35,117 E | 12/1995 | Rando et al. | |
| 5,581,064 A | 12/1996 | Riley et al. | |
| 5,640,002 A * | 6/1997 | Ruppert et al. | 235/462.46 |
| 5,665,953 A | 9/1997 | Mazzamuto et al. | |
| 5,767,896 A | 6/1998 | Nemirofsky | |
| 5,819,954 A | 10/1998 | Lacriola | |
| 5,905,246 A | 5/1999 | Fajkowski | |
| 5,907,350 A | 5/1999 | Nemirofsky | |
| 5,970,469 A * | 10/1999 | Scroggie et al. | 705/14 |
| 6,119,935 A | 9/2000 | Jelen et al. | |
| 6,129,276 A | 10/2000 | Jelen et al. | |
| RE37,166 E | 5/2001 | Rando et al. | |
| 6,572,020 B2 * | 6/2003 | Barkan | 235/472.03 |
| 6,895,419 B1 * | 5/2005 | Cargin et al. | 708/131 |
| 6,932,270 B1 | 8/2005 | Fajkowski | |
| 2002/0037097 A1 | 3/2002 | Hoyos et al. | |
| 2002/0055875 A1 | 5/2002 | Schulze, Jr. et al. | |
| 2002/0091569 A1 | 7/2002 | Kitaura et al. | |

(Continued)

*Primary Examiner*—Karl D. Frech
(74) *Attorney, Agent, or Firm*—Blakey Sokoloff Taylor & Zafman

(57) ABSTRACT

Embodiments of the invention relate to a system and method for real-time validation and redemption of paper and electronic coupons; electronic coupon distribution; electronic clearing and reporting of paper and electronic coupon redemptions; and an "Universal Club Card" that combines coupon scanning, coupon redemption, coupon distribution, loyalty cards, club cards, gift cards, frequent shopper programs, store credits and many other retail store promotions into one efficient and convenient portable scanning device.

6 Claims, 11 Drawing Sheets

U.S. PATENT DOCUMENTS

| | | |
|---|---|---|
| 2003/0024981 A1 | 2/2003 | Narasimhan |
| 2003/0204442 A1 | 10/2003 | Marshall |
| 2003/0233276 A1* | 12/2003 | Pearlman et al. .............. 705/14 |
| 2004/0112958 A1 | 6/2004 | Rosica |
| 2005/0045728 A1 | 3/2005 | Kargman |
| 2005/0102181 A1* | 5/2005 | Scroggie et al. .............. 705/14 |
| 2005/0149400 A1 | 7/2005 | Watkins |
| 2005/0171841 A1 | 8/2005 | Prorock et al. |
| 2005/0230473 A1 | 10/2005 | Fajkowski |
| 2006/0080111 A1 | 4/2006 | Homeier-Beals |
| 2006/0081718 A1 | 4/2006 | Havard |

* cited by examiner

UNIVERSAL CLUB CARD AND REAL-TIME COUPON VALIDATION

This application claims priority on U.S. Provisional Application No. 60/442,133 filed Jan. 22, 2003 and U.S. Provisional Application No. 60/461,493 filed Apr. 7, 2003.

FIELD

Embodiments of the invention relate to the field of communications. In particular, certain embodiments of the invention relate to a system and method for real-time validation and redemption of paper and electronic coupons; electronic coupon distribution; electronic clearing and reporting of paper and electronic coupon redemptions; and an "Universal Club Card" that combines coupon scanning, coupon redemption, coupon distribution, loyalty cards, club cards, gift cards, frequent shopper programs, store credits and many other retail store promotions into one efficient and convenient portable scanning device.

GENERAL BACKGROUND

Even in today's electronic world, many coupons and retail promotions are still printed on paper and distributed to customers through various forms of print media such as newspapers, magazines or direct mailings. It is estimated that manufacturers spend approximately $3 billion dollars each year just to distribute coupons nationwide. However, current coupon distribution or redemption schemes are only marginally effective because (1) numerous activities must be conducted before a coupon is redeemed, (2) use of coupons simply as a cash instrument and marketing tool ignores the value of customer profile information and buying habits of the customer, and (3) clearing of the coupon is performed manually.

In order to redeem a paper coupon, a customer needs to remove the paper coupon from its printed media and store the coupon for future use. Hopefully, at a later time, the customer remembers to take the paper coupon to the store for redemption. Once the coupon is accepted by the retailer, it is normally cleared manually by two different coupon clearing companies, namely a "manufacturers' clearing agent" and "retailers' clearing agent".

In general, a retail store typically collects all paper coupons redeemed by customers and sends them to a retailers' clearing agent. The retailers' clearing agent manually sorts paper coupons by those manufacturers' clearing agents that represent particular manufacturers. The retailers' clearing agent summarizes the information in a report and generates an invoice showing the face value of coupon and their "standard handling fees." The report and invoice are then sent to the respective manufacturers' clearing agent.

The manufacturers' clearing agent manually sorts the paper coupons by respective manufacturers and summarizes coupon redemption information in a report by product line, region, retail store, etc. The manufacturers' clearing agent shreds all accepted paper coupons and generates an invoice showing the face value of coupons, coupon handling, clearing and all other processing charges. The manufacturers' clearing agent also collects the invoice amount from manufacturers and pays the retailers' clearing agent and/or the retail store.

The current paper coupon clearing process is primarily a manual system with a number of disadvantages. For example, this process is time intensive. Under the current system, coupon clearing takes an average of 3–12 weeks from the point of redemption by customers to retailer reimbursement. It also takes approximately 3–9 months to receive any kind of feedback about the progress and results of a coupon campaign.

Another disadvantage associated with the current paper coupon clearing process is that it is labor intensive and costly. After being redeemed by a customer, a coupon goes through three different stages in clearing. This presents a financial burden for both manufacturers and retailers due to the amount of labor and time involved in handling and auditing the coupon process. It is estimated that a total of $1.5 billion per year in fees are paid to clearing agents by manufacturers.

Yet another disadvantage associated with the current paper coupon redemption and clearing process is that retailers and manufacturers incur substantial annual costs due to fraud and redemption errors (e.g., accepting expired coupons), charge backs, deductions and adjustments. It is estimated that manufacturers and retailers lose an estimated $500 million dollars per year due to redemption errors. Redemption errors occur primarily because Point of Sale (POS) systems do not validate the complete coupon barcode in real time. Most POS systems today validate only the manufacturer codes and some POS systems may validate both manufacturer codes and family codes. No POS systems validate the entire coupon barcode.

Under the current system, retail stores distribute magnetic media and/or barcode based plastic cards to store customers to identify their customers. Retail stores use such plastic cards for a variety of retail store programs such as loyalty cards, club cards, gift cards, frequent shopper programs, store credits, scrip programs etc. Such plastic cards do not provide two-way real time digital interactive communication capabilities between retailer and customer.

BRIEF DESCRIPTION OF THE DRAWINGS

The invention may best be understood by referring to the following description and accompanying drawings that are used to illustrate embodiments of the invention.

DETAILED DESCRIPTION

Figure 1:
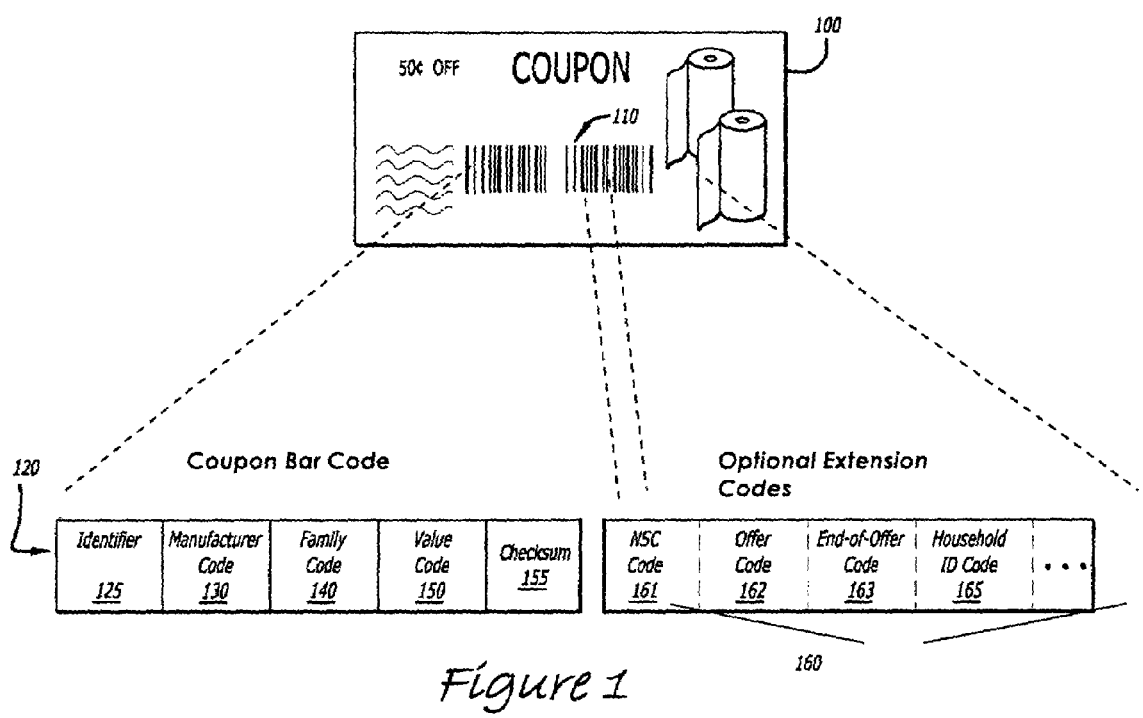
FIG. 1 is an exemplary embodiment of fields collectively forming a coupon barcode scanned by the scanner.

Exemplary embodiments of the invention relate to a system and method for coupon scanning, real-time coupon validation at a Point of Sale (POS) system, redemption, distribution, clearing and reporting. A portable scanning device is also used for customer identification and communication between customer and retailer. The portable scanning device effectively replaces the need for customers to carry multiple magnetic media and barcode based plastic cards.

In one embodiment, a coupon processing system comprises multiple mechanisms for printed data objects to be scanned and digitally stored in memory for subsequent redemption at a Point of Sale. One mechanism comprises a portable scanning device, referred to herein as a "scanner," that is distributed to a customer and in the customer's possession. The stored data object is received from the scanner once communications between the scanner and selected equipment at the retailer are established. Another mechanism involves a stationary kiosk that scans data objects from printed materials fed into the kiosk and stores the data objects within a database associated with the customer. The stored contents of the database are accessible by a POS system at the retailer.

In the following description, certain terminology is used to describe features of the invention. For example, "software" may be code or a series of instructions adapted as firmware or configured as an operating system, a program, a downloadable applet, a routine, or the like. The software can be stored in any type of machine readable medium and executed by a processing unit. Examples of "machine readable medium" include a programmable electronic circuit, a semiconductor memory device including volatile memory (e.g., random access memory, etc.) or non-volatile memory (e.g., any type of read-only memory "ROM", flash memory), a floppy diskette, an optical disk (e.g., compact disk or digital video disc "DVD"), a hard drive disk, tape, or the like. Examples of a "processing unit" comprises a digital signal processor, a general microprocessor, a micro-controller, a state machine, an application specific integrated circuit, a state machine or the like.

In general, it is contemplated that integration Software may be used for interface, transmission and communication of data between various components of the portable scanner system described below. Redemption software may be used for validation and redemption as well as maintaining customer files. Distribution Software may be used for filtering logic and selection of coupons from database to upload into customer accounts and portable scanner described below.

A "link" is broadly defined as one or more information-carrying mediums to establish a communication pathway. For instance, the information-carrying medium may support wireless communications (e.g., infrared "IR", laser, radio frequency, cellular, satellite, etc.) or communications over physical medium such as electrical wire, optical fiber, cable, bus traces and the like.

In addition, the term "scanning", as referred to herein, involves detection and identification of data objects by a scanner for internal storage or later transmission over a link. One type of data object is a barcode which, for example, may be in accordance with any one of the commonly accepted barcode formats such as Universal Product Code (UPC), EAN, Code 39, Code 128, etc. The barcode may be printed on a coupon (e.g., coupon barcode "CBC") or may be used to identify a product, service or customer (e.g., product barcode "PBC").

Referring now to FIG. 1, an exemplary embodiment of fields collectively forming a barcode 110 is shown. Barcode 110, associated with a product or placed on a coupon 100 as shown, comprises a plurality of code fields 120. For example, barcode 110 may be a fixed format such as a 12-digit UPC or a 13-digit EAN-99. For this embodiment, barcode 110 comprises fields 120 with the following information: (1) an identifier 125 of the type of barcode. As an illustrative example, a single digit "5" may be used to identify a UPC barcode whereas two digits "99" may be used to identify an EAN-99 (in-store) barcode; (2) a manufacturer code 130 (e.g., 5-digits); (3) a family code 140 (e.g., 3-digits) to identify a specific group of products; (4) a value code 150 (e.g., 2-digits) that specifies a monetary value or credit (directly or via a determined code value) and multiple quantity offers; and (5) a checksum 155 (e.g., a 1-digit check digit calculated from all the previous fields that is used by scanners to ensure that the barcode was successfully read).

Barcode 110 may further comprise extension code fields 160 so as to provide additional information or expand current code fields. For example, there are five formats for the extension code. Different application identifiers are used to identify the formats. The following field elements may be optionally specified: (i) a Number System Character (NSC) code 161 (e.g. 1-digit) used to distinguish manufacturers with the same 5-digit manufacturer code but different NSCs; (ii) an offer code 162 (e.g., 5-digits) that may be used by coupon issuers or clearing houses for their own use; (iii) end-of-offer code 163 (e.g., 2-digits) associated with expiration date of the coupon; and/or (iv) a household identifier code 165 (e.g., 8-digits). The extension code fields 160 allow for future codes to be added as needed. Of course, any type of barcode format and related barcode information may be stored in the internal memory.

Figure 2:
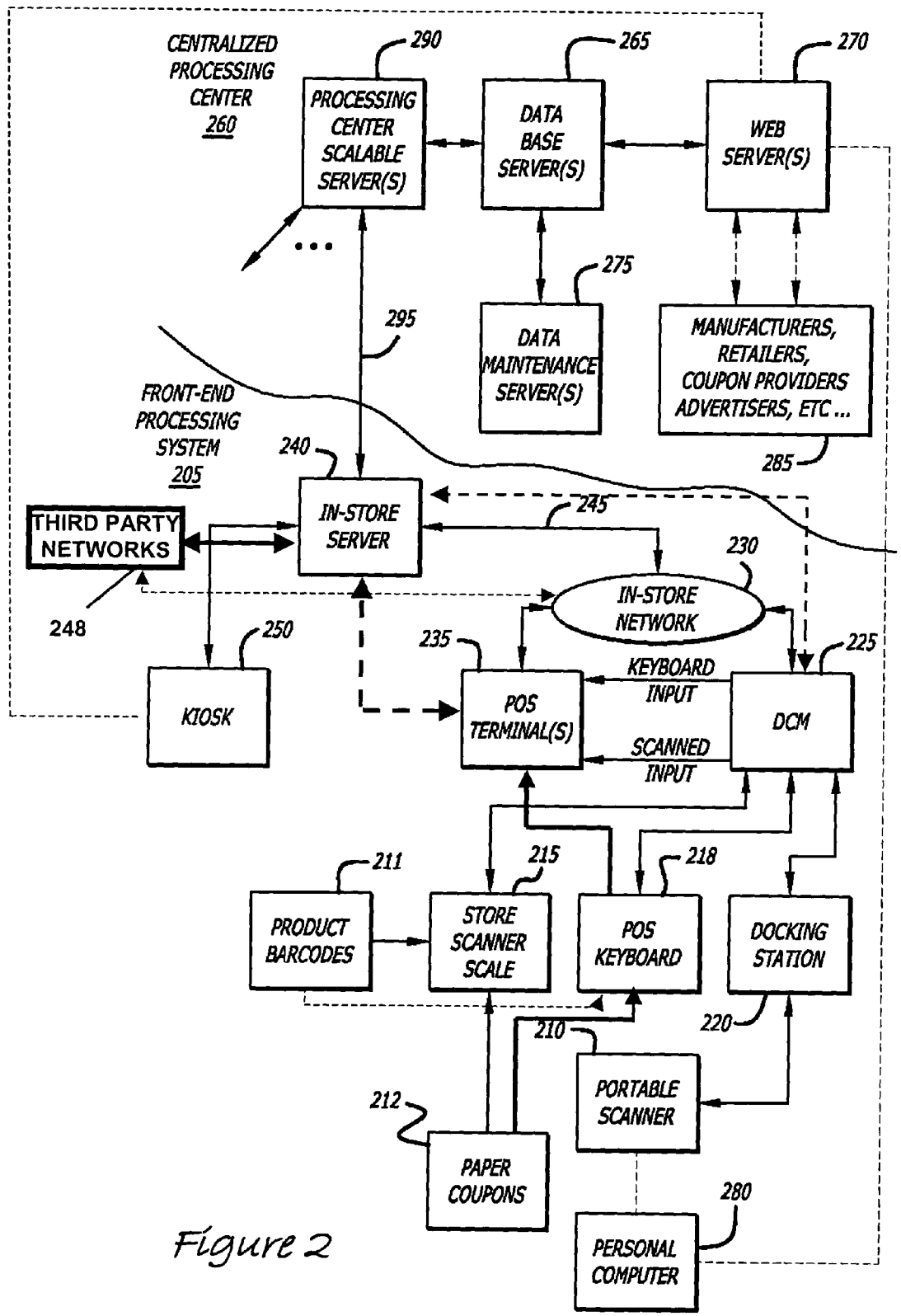
FIG. 2 is an exemplary embodiment of a "Universal Club Card" and coupon validation/redemption/distribution system in accordance with the invention.

Referring now to FIG. 2, an exemplary embodiment of a Portable Scanner System (PSS) 200 is illustrated. PSS 200 comprises a front-end processing system 205 deployed within a store and adapted for communication with a centralized processing center 260. It is evident from the illustrative embodiment that the information from product barcodes 211, paper coupons 212 and information from a portable scanner 210 can be configured in multiple ways to flow through an in-store network 230 and an in-store server 240.

Herein, situated at a store and adapted to receive portable scanner 210, one embodiment of front-end processing system 205 comprises a store scanner/scale 215, a POS keyboard 218, a docking station 220, a Data Collection Module (DCM) 225, one or more POS terminals 235, in-store network 230 that collectively operates elements 215, 218 and 235 as a POS system, and in-store server 240 that communicates directly or indirectly with DCM 225 or docking station 220 or POS terminal 235 and/or in-store network 230. An optional kiosk 250 may also communicate with in-store server 240.

In general, scanner 210 comprises a data input mechanism to scan data objects (e.g., barcode, symbol, alphanumeric character, text or pictures) printed on material for subsequent storage as digital data. Docking station 220 enables communications between scanner 210 and one or more of the following: DCM 225, POS terminal 235, in-store network 230, and in-store server 240. Of course, other equipment may be deployed within system 205, including but not limited or restricted to kiosk 250 or one or more servers 290 forming part of the centralized processing center 260, which is physically located away from the store.

As further shown, centralized processing center 260 comprises central server (CSS) 290 that communicates with at least one database server 265 and in-store server 240. Database server (DBS) 265 communicates with one or more data maintenance clients (DMC) 275 and with one or more web servers 270. Web server 270 communicates over the Internet with manufacturers, retailers, coupon providers, and advertisers (285) as a coupon promotion mechanism.

In-store server 240, in addition to communicating back to central server 290, communicates with each POS terminal 235, directly or through in-store network 230, and with each in-store kiosk 250. Docking station 220 located at each checkout lane in the store communicate with in-store server 240, directly (not shown in FIG. 2) or through DCM 225, POS terminal 235 and/or in-store network 230 directly (not shown in FIG. 2) or through DCM 225.

Alternatively, in-store server 240, in addition to communicating back to central server 290, communicates with each POS terminal 235 via DCM 225 and with each kiosk 250 directly or via DCM 225. DCM 225 manages the communications between in-store server 240 and at least one POS terminal 235. DCM 225 may have the capabilities to be a network hub to the existing in-store network 230 or directly attaches to in-store server 240.

DCM 225 may also have the capability to act as a wedge between POS terminal 235 and its scanner/scale 215 and keyboard 218. Specifically, scanner/scale 215 and keyboard 218 of POS terminal 235 are connected directly to DCM 225, rather than to POS terminal 235. Proper connections are then made from DCM 225 back to POS terminal 235 including one connection to a scanner/scale port of POS terminal 235 and another connection to a keyboard port of POS terminal 235. Under this flow of information, all scanned or manually entered product barcodes (referred to as "PBCs") and coupon barcodes (referred to as "CBCs") can be intercepted by DCM 225 before being passed on to POS terminal 235 or sent to in-store network 230 or in-store server 240 for coupon validation, redemption and processing.

Docking station 220 for scanner 210 is located at each checkout lane in the store. As shown, docking station 220 is in communication with DCM 225, but may be alternatively coupled to in-store network 230 or in-store server 240 (not shown in FIG. 2).

Figure 6:
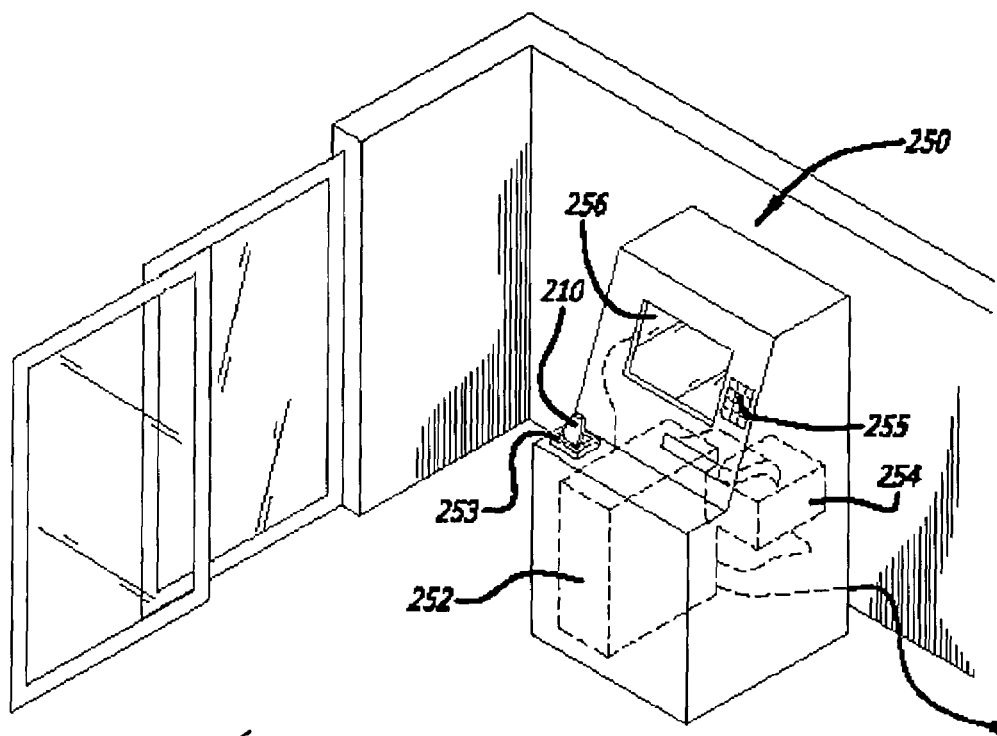
FIG. 6 is a first exemplary embodiment of the kiosk of FIG. 2.
Figure 7:
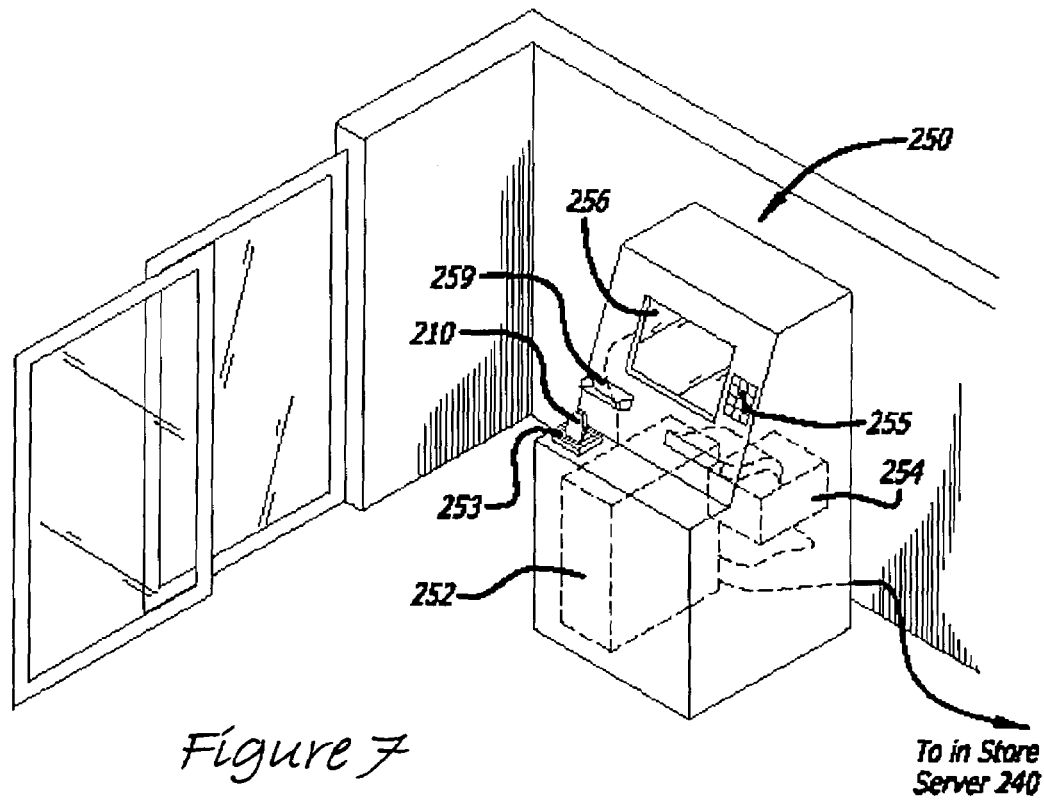
FIG. 7 is a second exemplary embodiment of the kiosk of FIG. 2 having a mechanism for scanning and collecting printed coupons.

Kiosk 250 communicates with in-store server 240. Kiosk 250 may comprise in its design one or more of the following: a computer, monitor, printer, paper coupon transport, scanner and holding bin, DCM and a docking station for scanner 210. A more detailed illustration of embodiments of kiosk 250 are shown in FIGS. 6–7. At least one physical or wireless link 245 is established between in-store server 240 and in-store network 230.

Similarly, at least one physical or wireless communication link 295 is established between in-store server 240 and central server 290. This link 295 may be through the Internet or through a private network. For example, kiosk 250 can communicate directly with central server 290 or web server 270 (not shown in FIG. 2), and/or communicate via in-store server 240.

Figure 3:
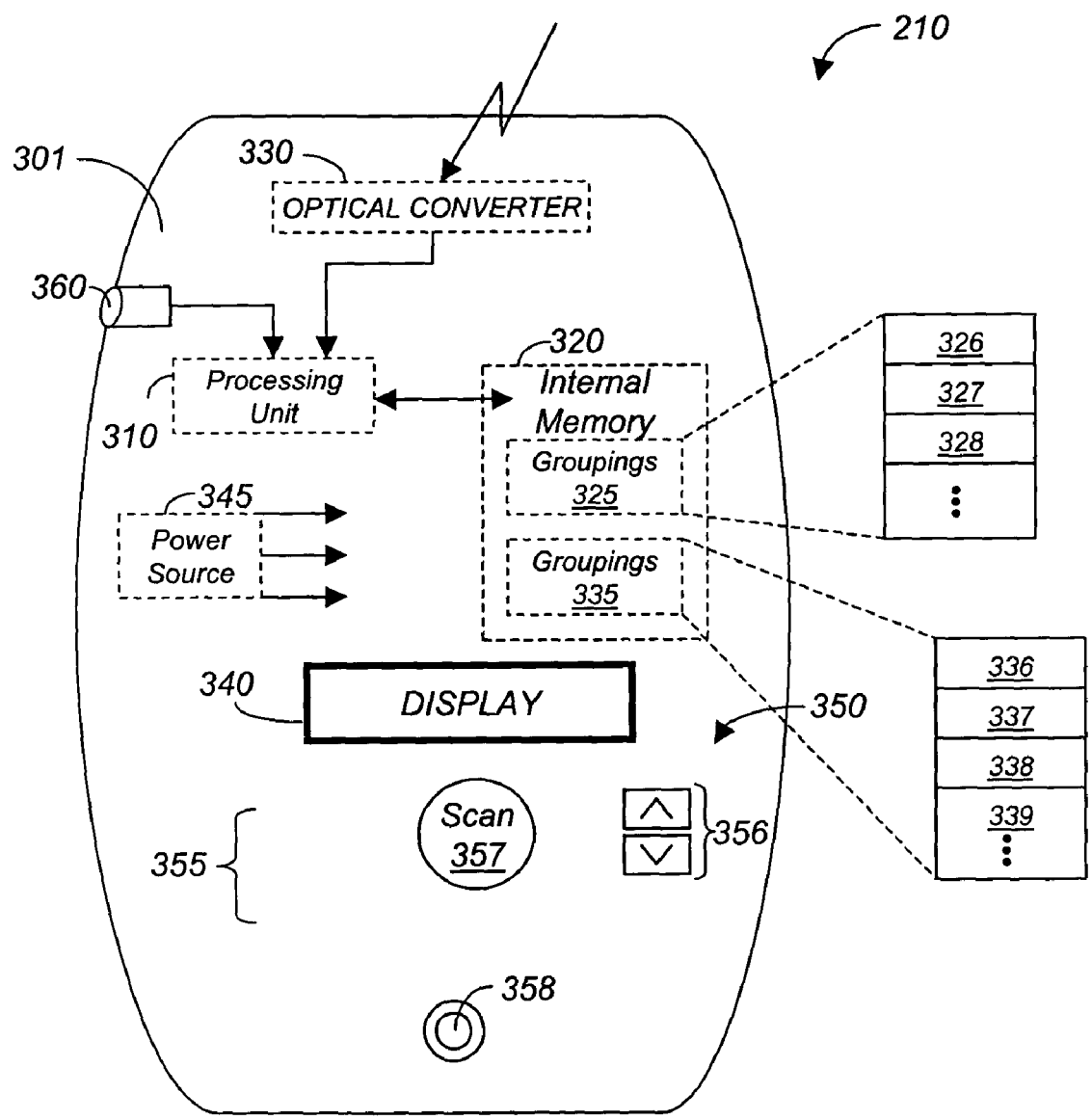
FIG. 3 is a first exemplary embodiment of a portable scanning device of FIG. 2.

Referring now to FIG. 3, a first exemplary embodiment of scanner 210 of FIG. 2 is shown. Scanner 210 is a personal data collector for scanning, storing and redeeming coupons. Portable scanner 210 is also used for customer identification and communication.

In one embodiment, scanner 210 comprises a casing 300 that houses a processing unit 310, a memory 320 to contain data organized into a plurality of data storage groupings 325 and 335, an optical converter 330, a display 340 and a power source 345 to supply power to components enclosed within casing 300. Each scanner is assigned a unique ID number to enable identification of scanner 210 and the customer. Prior to distribution of scanner 210, a customer is requested to complete a detailed application/registration form that describes his or her profile such as address, age, gender, general annual income, gender/age of children (if any), or the like. The customer can provide his or her profile by other mechanisms such as entering the information directly at in-store kiosk 250 of FIG. 2, or importing the information into web server 270 of FIG. 2 over the Internet.

Referring still to FIG. 3, casing 300 is made of a protective material (e.g., hardened plastic) to protect components of scanner 210 from adverse environmental conditions. Casing 300 features an interface 350 positioned along a surface 301 of casing 300. Interface 350 enables a customer to control operations of scanner 210 and provides a warning to the customer in response to a failed scanning operation. In one embodiment, interface 350 comprises a keypad 355 having one or more scroll keys 356 which, when depressed, enables a viewing customer to scroll and review scanned coupons, or any other information stored in scanner 210, on display 340. Other keys may include a scan key 357 which, when depressed, activates converter 330 to scan a data object, such as a printed barcode for example, produce a digital representation of the barcode. Interface 350 may further comprise any components (e.g., speaker, at least one light emitting diode "LED" 358 as shown, etc.) to notify the customer that a scanned barcode has been accepted and/or rejected.

In this embodiment, display 340 may be a liquid crystal display (LCD) or any low-power display. When configured with scrolling capability, display 340 may be sized to illustrate two or more lines of alphanumeric characters having a predetermined number of characters per line (e.g., 20 characters) or graphic objects. However, it is contemplated that the size of display 340 may be varied.

A first data storage grouping 326 is sized to store a plurality of barcodes (e.g., 2,000 or more barcodes), which represents a listing of coupons offered by manufacturers and retailers that are currently active in the market for a particular geographic region. This "database" of current coupons is downloaded and kept current on scanner 210 whenever scanner 210 is docked by the customer at the store (either at kiosk 250 or docking station 220) or at his computer over the Internet.

Thereafter, when a customer scans a barcode from any printed coupon and scanner 210 stores that barcode in a second data storage grouping 327, information about the scanned coupon already contained in first data storage grouping 326 is linked to the newly scanned coupon. This information includes value of coupon, description of the discounted product, description of the manufacturer and other information useful for the customer to identify the nature of the coupon (hereinafter referred to as "coupon descriptive information"). This will enable the customer to scroll and review on display 340 the coupon descriptive information. First data storage grouping 326 is a collection of all coupons offered by manufacturers that are currently active in the market for a specified geographic region, but the contents of grouping 326 are not accessible by in-store network 230 or in-store server 240 of FIG. 2 for coupon redemption purposes.

When the customer scans a barcode from a printed coupon, processing unit 310 compares the scanned barcode with the list of CBCs of first data storage grouping 326 to find a match. Processing unit 310 may assign a unique identification (ID) number to each matching CBC and store such information along with coupon descriptive information as part of second data storage grouping 327. If a matching coupon is not within first data storage grouping 326, processing unit 310 stores unmatched barcodes as part of a third data storage grouping 328. Of course, in lieu of such operations being performed by processing unit 310, it is contemplated that the comparison operations can be performed by separate comparison logic (not shown).

A "data storage grouping" is defined herein as a file, group of files, a folder or sub-folder, a directory or sub-directory or a separation within internal memory 320 to store different types of data. A data storage grouping can store any type of data including barcodes, alpha-numeric characters, graphic images etc. Certain types of data, such as coupon descriptive information, matched barcodes, unmatched barcodes, customer identification data, retail store information, manufacturer information, UPC codes, transaction files etc., may be grouped together and saved within a data storage grouping.

It is contemplated that a data storage grouping can be structured as "read only", password protected etc. As a result, only certain types of information contained within a data storage grouping is accessible by certain components of the PSS 200 such as in-store network 230 and/or in-store server 240, for example.

It is further contemplated that scanner 210 may be configured to automatically delete valid barcodes with matching purchases transmitted to the POS system of FIG. 2, so that the customer cannot use the same coupon again. In addition, scanner 210 can be programmed to automatically delete expired coupons immediately or after a certain time period has elapsed. This may be done by processing unit 310 periodically by comparing time/date from a real-time clock with the end-of-offer code of the stored barcodes.

As an optional feature, scanner 210 may comprise one or more communication ports 360 to receive and process data for subsequent storage within memory 320 as well as to transmit and allow extraction of stored data. In one embodiment, communication port 360 features a hard pin similar to the cell phone battery charger so that communication port 360 is sturdy and durable. Yet in other embodiments, communication port 360 may be a serial port, a Universal Serial Bus (USB) port, or a wireless transceiver to receive and transmit data in accordance with any wireless transmission protocol (e.g., IR, IEEE 802.11 signaling, HyperLAN/x signaling, etc.). Communication port 360 is adapted for coupling to docking station 220 and/or kiosk 250 of FIG. 2.

Figure 4:
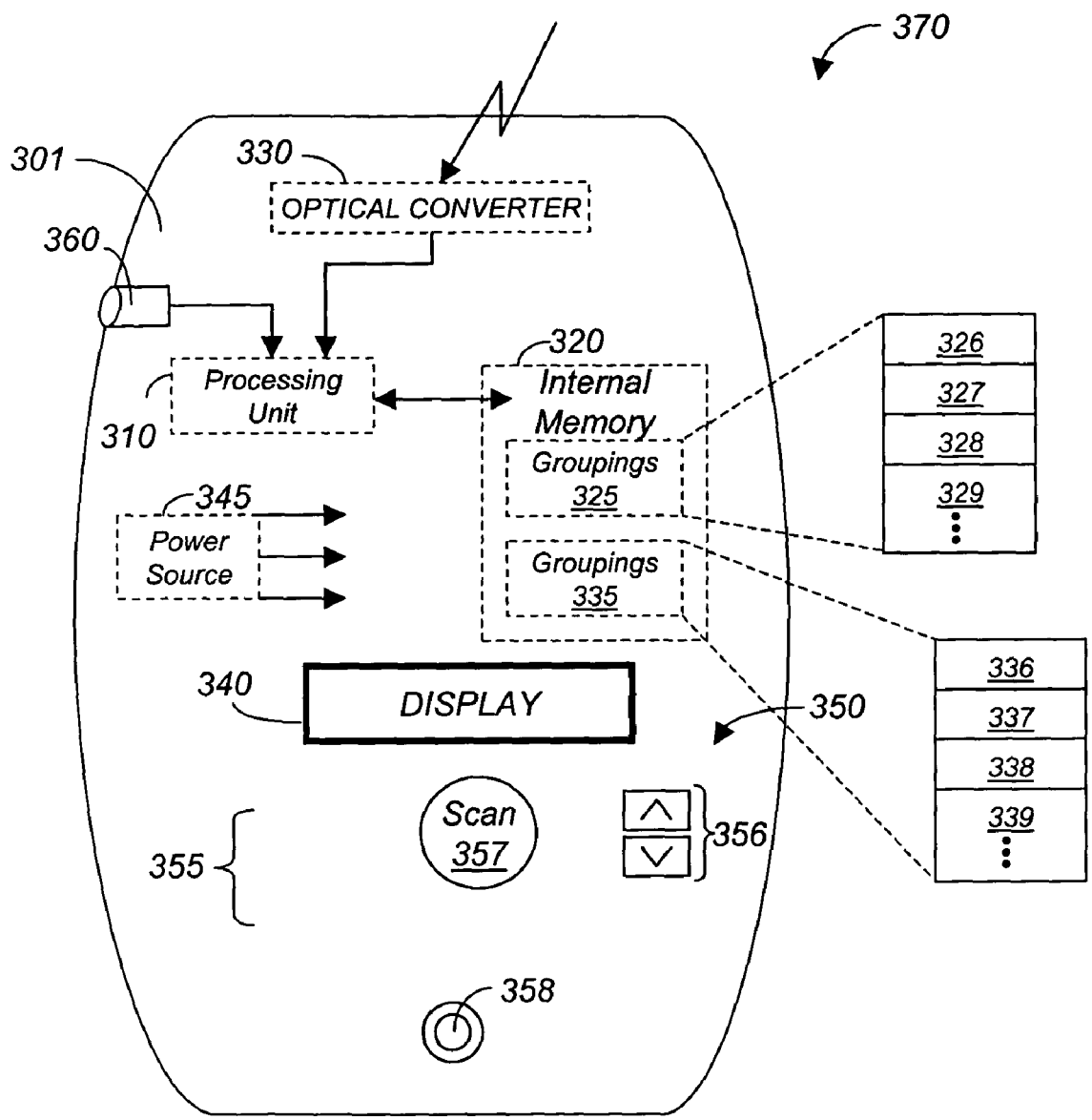
FIG. 4 is a second exemplary embodiment of the portable scanning device of FIG. 2.

Referring now to FIG. 4, a second exemplary embodiment of scanner 210 of FIG. 2 is shown. This scanner, represented as scanner 370, includes those components/interface(s)/port (s) set forth in scanner 210 of FIG. 3, but with memory 320 adapted for storage of a fourth data storage grouping 329. Fourth data storage grouping 329 is configured to store manufacturer codes for each manufacturer participating in the PSS 200 of FIG. 2. Thus, scanner 370 can be configured to notify a customer (e.g., produce an audible sound, display a warning, vibration, etc.) in the event that a manufacturer does not honor an electronic coupon or participate in the PSS 200 being deployed.

Figure 5:
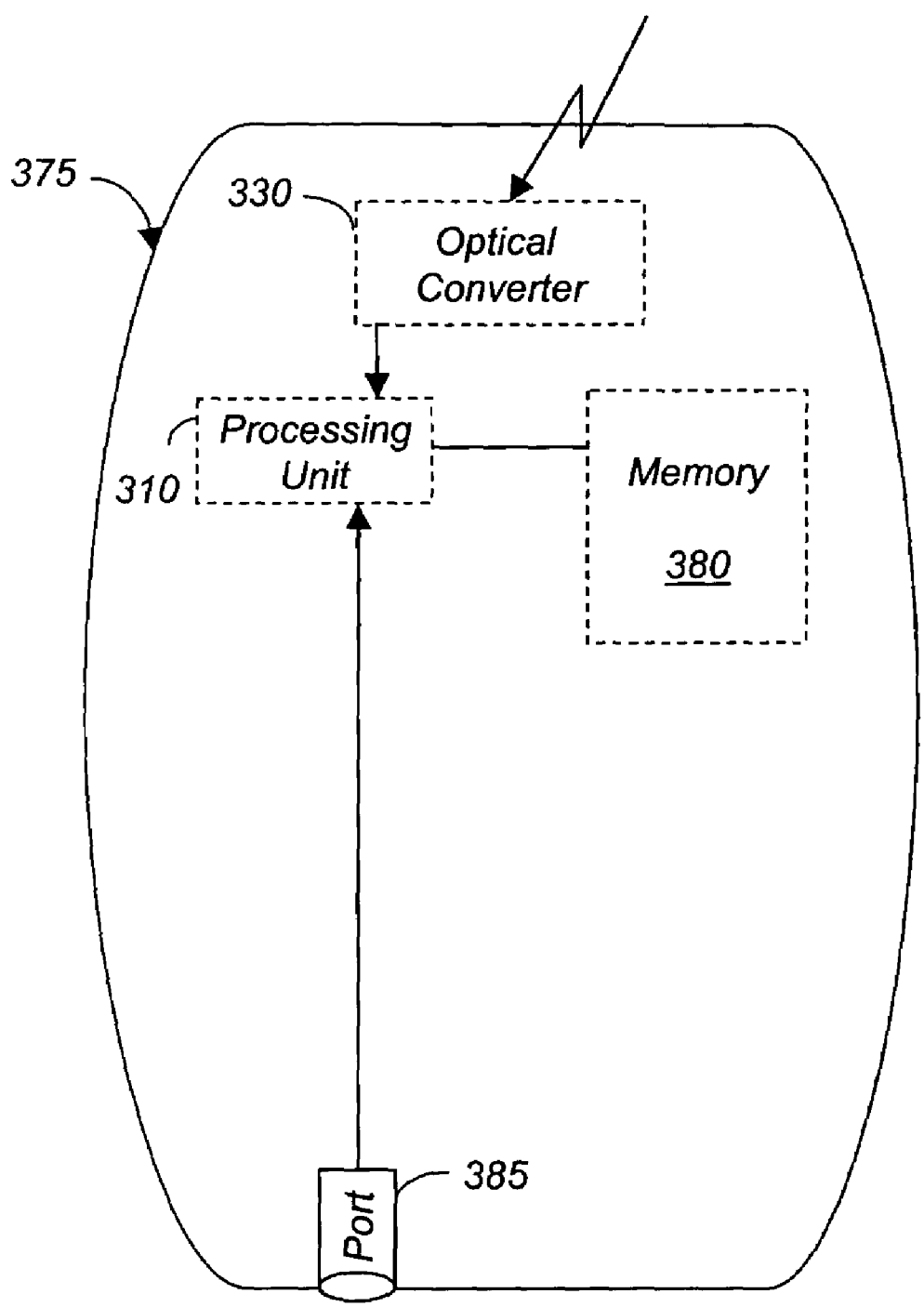
FIG. 5 is a third exemplary embodiment of the portable scanning device of FIG. 2.

Referring now to FIG. 5, a third exemplary embodiment of scanner 210 of FIG. 2 is shown. This scanner, represented as scanner 375, is configured similarly to that shown in FIG. 3, but without display 340. Scanner 375 is configured without a display, and thus, does not support scrolling. Also, scanner 375 may not support write or uploading capabilities as set forth in the first embodiment. Scanner 375 comprises an internal memory 380 that is configured to store a plurality of coupons, such as 100 or more barcodes for example, and is supplied power via batteries that provide charge sufficient for a few thousand scans. Scanner 375 features a communication port 385 and having either a serial, RS-232 or USB data communication jack used to connect to a personal computer. This communication port 385 enables a customer to determine which coupons are currently stored within the coupon scanner. Communication port 385 will also be used to connect scanner 375 to docking station 220 of FIG. 2 as well as kiosk 250 as shown in FIGS. 6-7.

Referring back to FIG. 2, docking station 220 is an interface that enables communications between scanner 210 and one or more of the following: POS system, in-store server 240 and/or in-store kiosk 250. In one embodiment, docking station 220 is a cradle onto which scanner 210 is situated and plugged into at checkout. When placed into the cradle, connection may be made either directly by electrical contact or indirectly via wireless communication methods such as infrared communicators.

Alternatively, in another embodiment, docking station 220 is a connecting port featuring a thick, hard pin (like a cell phone battery charger) placed at one end of a cable adapted for coupling to a communication port of scanner 210. In yet another embodiment, docking station 220 may be a cable that supports serial, RS-232 or USB communication ports. Docking station 220 may be located next to a credit card machine at the checkout lane to sign credit card slips so that it does not occupy additional space at the checkout lane.

In one embodiment, in-store server 240 receives barcodes scanned and saved in scanner 210. Central server 290 retains proprietary redemption, clearing and distribution software and is also duplicated on in-store server 240. All coupon offers, customer information and transaction data is stored back at the centralized site on database server (DBS) 265 to facilitate its maintenance and integrity. Data stored at DBS 265 includes customer account information, transaction history and profiles, complete coupon definitions and rules for redemption and promotion, manufacturer identifiers and descriptions, coupon classifications and detailed data on attempted coupon redemptions, whether successful or not, and coupon offers.

In order to optimize efficiencies and enable in-store server 240 to function successfully even when communications between in-store server 240 and central server 290 have failed, some of the data is also duplicated on in-store server 240. In particular, the coupon classifications and complete coupon definitions and rules for redemption and promotion are periodically downloaded from central server 290 to in-store server 240. Also, a subset of the customer account information, transaction history and profiles is retained on the in-store server for active customers of the store.

In-store server 240 also maintains customer account information, profile and past transaction history. It is contemplated that the validation and redemption functionality of in-store server 240 may also be consolidated in central server 290 as described below. The POS system may receive validated CBCs from in-store server 240 or central server 290 for further processing.

Referring to FIG. 6, a first exemplary embodiment of kiosk 250 of FIG. 2 is shown. In the event that scanner 210 does not have a display, kiosk 250 can be configured to download barcodes associated with manufacturer and retail store coupons from scanner 210 to kiosk 250 and to provide customers with an ability to scroll and review coupons stored within scanner 210 via display 256. In general, kiosk 250 comprises one or more of the following: a computer 252, a docking station 253, a printer 254, DCM (not shown), a customer authentication mechanism 255 and a display 256.

It is contemplated that "customer authentication mechanism" 255 may be employed so as to verify that a customer is using the correct scanner. Examples of authentication mechanisms may include, but are not limited to the following: (1) a keypad that enables the customer to enter a predetermined personal identification number, (2) computer generated screen display to have the customer spell his or her last name where display 256 is a touch-screen display, (3) a biometric reader to scan a fingerprint, facial geometries, or the like.

As shown, located within the store or approximate to its entrance, kiosk 250 receives uploaded coupons from both manufacturers and retailers. In one embodiment, once scanner 210 is connected to kiosk 250, descriptions (e.g., graphic images, alphanumeric text, etc.) of those coupons available to the customer of scanner 210 are shown on display 256. Targeted coupons available to the customer of portable scanner 210 may be selected based on a filtering process from a database of manufacturers and retailers coupons maintained either in in-store server 240 and/or database server 265 of FIG. 2. In one embodiment, the filtering process is based on customer profile/demographic information entered from application/registration forms filled by the customer, past and/or current transaction history and manufacturer/retailer instructions, if any, for selecting targeted promotions.

Display 256 may be a touch screen to allow a customer to select which electronic coupons to download into portable scanner 210. This will allow manufacturers and individual stores to target special promotions by location or by customer. This will also assure the manufacturers and retailers that the coupons are reviewed and uploaded into scanners held by customers just before their buying process.

Additionally, customers probably will not remember what coupons were scanned into their scanners especially if no display is provided on scanner 210. In order to facilitate the review of coupons, when scanner 210 is docked at kiosk 250, integration software executed by computer 252 will read and print all coupons saved in scanner 210 on printer 254. The print out of coupon listing may include some or all of the following information: barcode as printed on the coupon, description of coupon, manufacturer name, face value, expiration date and any other terms and conditions of coupon printed on the coupon but not included on the barcode such as limits per purchase and per customer.

It is contemplated, however, that the filtering process and/or integration software may be uploaded to customer's personal computer 280 and/or web server 270. This enables the customer to download coupons into the scanner prior to visiting the store.

Referring now to FIG. 7, a second exemplary embodiment of kiosk 250 of FIG. 2 is shown. Kiosk 250 comprises a scanner/barcode reader 259 for scanning and collecting printed coupons to allow the customers to physically feed their paper coupons into kiosk 250. Scanner 259 scans paper coupons deposited by customers directly at the kiosk 250. The paper coupon information read by scanner 259 is stored within a database in in-store server 240 of FIG. 2. Such storage may be arranged based on the customer name, address, phone number, loyalty card number, scanner, ID number etc.

The paper coupons deposited at kiosk 250 can be accessed over the POS system at the time of purchase by providing any customer identification information given above. This process will move the paper coupon scanning process to kiosk 250 and speed up the check-out lane. This enables new customers with paper coupons who do not own a scanner to participate in the PSS 200. This will also enable customers to deposit paper coupons from non-participating manufacturers into a kiosk and participate in the coupon validation process.

Paper coupons deposited into kiosk 250, but not redeemed by a customer during their current visit, will be stored within in-store server 240 and transmitted to central server 290 of FIG. 2. All unused coupons will be available for redemption by the customer during subsequent visits to any retail store that has deployed a portable scanner system that communicates with other systems at different locations.

Referring back to FIG. 2, centralized processing center 260 comprises central server 290 that is scalable and communicates with DBS 265. DBS 265 communicates with DMC 275 and web server 270. Central server 290 possesses a detailed database and is capable of processing large volumes of data. In one embodiment, central server 290 features a two-way communication link with in-store server 240 and/or kiosk 250. Central server 290 can generate reports to be provided to the manufacturers, retailers and coupon providers based on usage according to products sold, customers, store locations or the like. These reports can be sorted as requested by the manufacturers, retailers and coupon providers.

Central server 290 can also provide a complete electronic proof of purchase. Herein, as one embodiment, an "electronic proof of purchase" comprises a) date and time stamp; b) store and aisle location where the coupon was redeemed; c) product/s purchased by the customer for every paper and electronic coupon redeemed; d) original product price, face value of coupon redeemed, additional discounts, such as double coupons, provided by retailers and the net amount paid by customer for the product/s purchased; and e) the customer name, contact information and/or ID number of the customer who redeemed the coupon.

In another embodiment, it is contemplated, that central server 290 may be adapted to process and validate CBCs from paper coupons and from scanner 210 in the event that in-store server 240 is not deployed at the retailer. For this embodiment of the invention, the POS system would receive validated CBC directly from central server 290 or through DCM 225 for further processing. Instead of in-store server 240, DCM 225 will match the PBC with CBC and transmit the matched CBCs via high-speed transmission links, such as T-1 lines, to central server 290 for validation. This is similar to the credit card information transmitted to an outside third party host for approval. Central server 290 will perform the same logical functions as in-store server 240, validate the CBC and transmit the validated CBC back to DCM 225. DCM 225 will transmit the validated coupon information and/or appropriate credit to the POS system for further processing.

Referring still to FIG. 2, centralized processing center 260 further comprises web server 270 that is designed to facilitate interaction between customers, manufacturers, retailers and marketers. Web server 270 provides a website that posts a collection of coupons. Customers can establish their own individual accounts secured by a password and review the coupons posted on the website. Those selected coupons can be downloaded into scanner 210 via a computer or via kiosk 250. In addition, manufacturers, retailers and marketers can establish their business accounts secured by their passwords. Business account holders can upload new coupons offered into central server 290 through the website. Business account holders can also review the progress and results of coupon campaigns via the website, which provides real-time access to coupon usage and progress of coupon campaigns.

Central server 290 of FIG. 2 communicates with various third party websites such as UPC, debar code, EAN, etc. to update the UPC and product codes. In-store server 240 and kiosk 250 communicate with central server 290 through the Internet or high-speed transmission links such as T-1 or dedicated lines.

Figure 8:
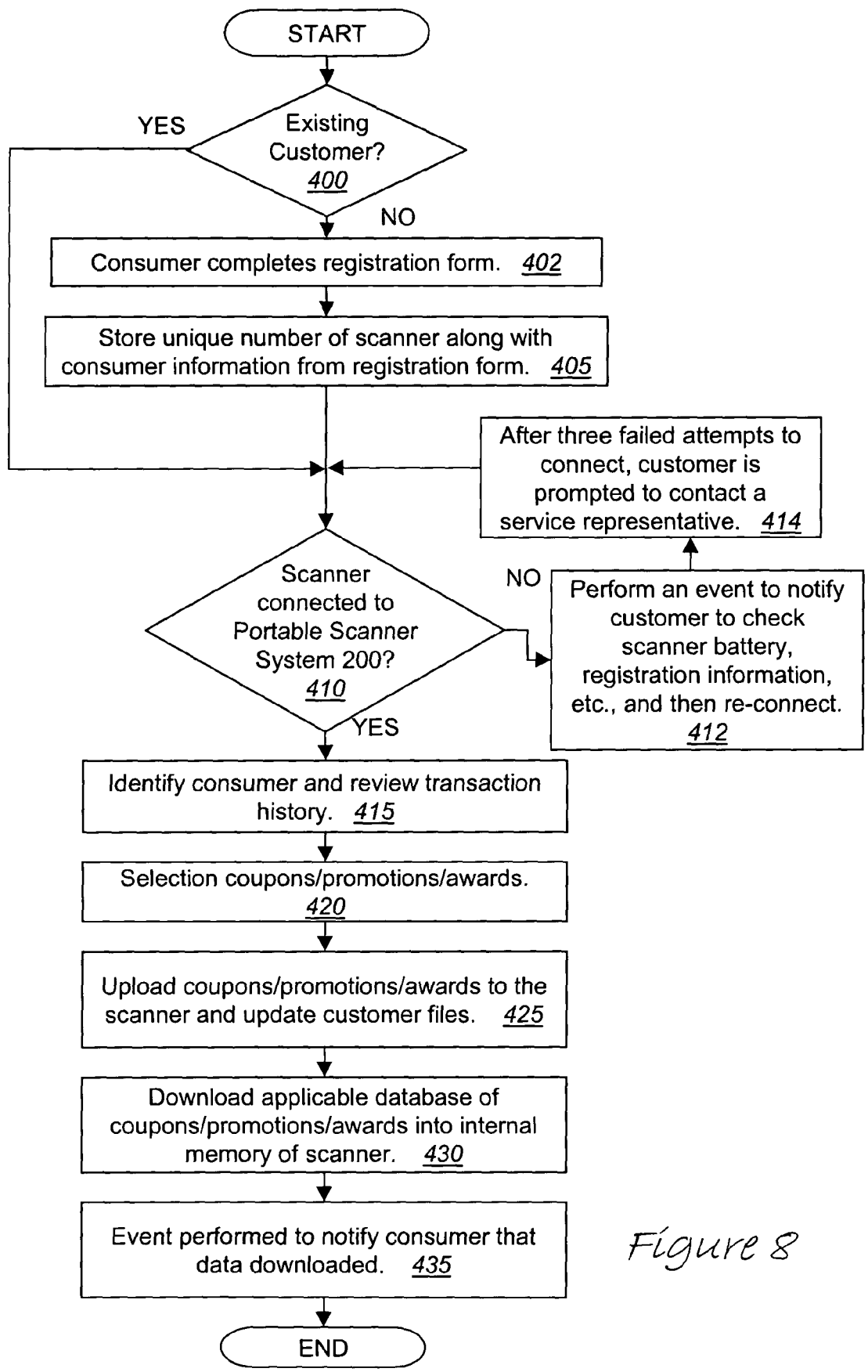
FIG. 8 is a first exemplary embodiment of an electronic coupon distribution process supported by the coupon system of FIG. 2.

Referring to FIG. 8, a first exemplary embodiment of an electronic coupon distribution process supported by the system of FIG. 2 is shown. Initially, a determination is made whether the customer is new or existing (block 400). If a new customer, he or she completes a short registration form before a scanner is issued (block 402). The registration form is designed to gather customer profile and demographic information, which can be used to target distribution of certain electronic coupons. For instance, a customer with children under three years of age may be targeted to receive diaper coupons and other infant or toddler care products. The customer profile and demographic information along with the unique identification number associated with the scanner are entered into the data maintenance client, which updates the database server. Alternatively, customer can input information from registration forms and also update/modify their profile and demographic information directly at a kiosk and also via Internet (block 405).

When a scanner establishes a communicative coupling to the kiosk, the POS system or a website via the web server (block 410), a variety of tasks are performed by distribution software. For one embodiment, the distribution software is loaded into the in-store server. If the scanner is not properly docked or identified by the portable scanner system (PSS), the scanner and/or PSS will perform an event (e.g., produce an audible tone, flash an LED indicator, etc.) to inform the customer that the scanner is not properly connected or identified. The customer is prompted to check if their registration is up to date, check the scanner battery or the like, and then re-connect to the PSS (block 412). After three failed attempts to establish communication link with the PSS, customer is prompted to contact a customer service representative (block 414).

If the scanner is properly connected, the customer is identified and the transaction history of the customer is reviewed (block 415). A few coupons from the database of coupons, stored in either the database server or the in-store server, are selected based on customer profile, demographics, current and past transaction history and perhaps manufacturer's/retailer's instructions if any (block 420). Note that the scanner does not have to be connected to the PSS for the coupon selection and filtration process to take place. In other words, the coupon selection and filtration process may occur at any time, even on a nightly job, and the selected coupons can be saved in registered customers accounts within the database server and downloaded to the applicable in-store servers.

The selected coupons, including coupons saved in customer account maintained by the database server and/or in-store server, are uploaded into internal memory of the scanner via the kiosk, POS system or personal computer. Then, the customer account in the database server and/or in-store server is updated (block 425). Where the internal memory of the scanner is segmented into multiple storage groupings as shown in FIGS. 3 and 4, the selected coupons are uploaded into the second data storage grouping. Simultaneously, the first data storage grouping is updated to include all applicable current and active coupons offered by manufacturers and retailers applicable for that specific geographic region (block 430).

The scanner will perform some perceivable event (e.g., flash LED light or display backlight, produce an audible sound, etc.) to notify the customer that new electronic coupons have been received (block 435). At a later time, customers can scroll and review these new electronic coupons and any other information received by the scanner and either keep them or delete them. Where the scanner has no display capability, the review can be performed at the kiosk or personal computer. Manufacturers are thereby assured that electronic promotions uploaded into scanner are visually reviewed by customers.

Figure 9:
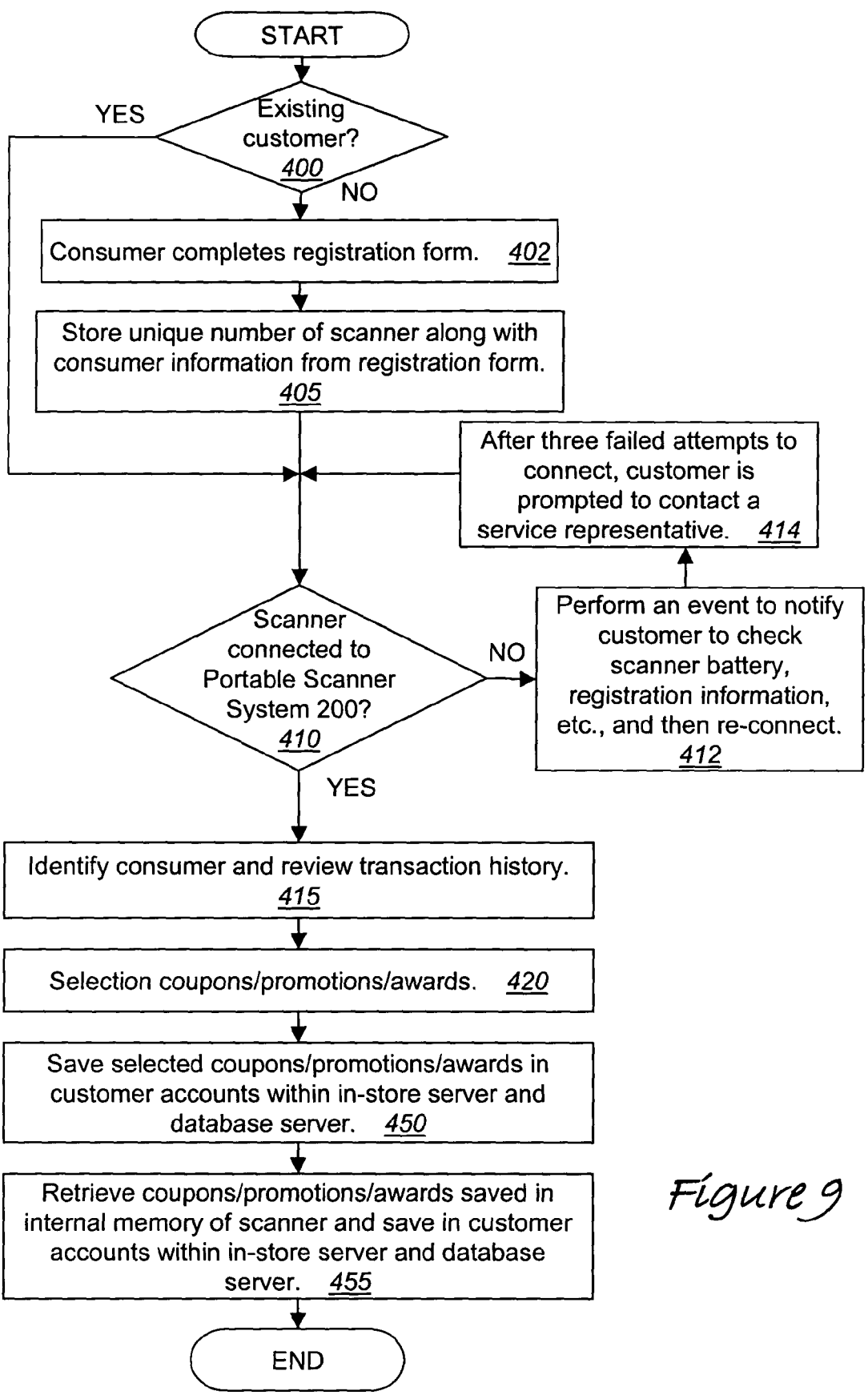
FIG. 9 is a second exemplary embodiment of the electronic coupon distribution process supported by the coupon system of FIG. 2.

Referring to FIG. 9, a second exemplary embodiment of an electronic coupon distribution process supported by the system of FIG. 2 is shown. Under this embodiment, the portable scanner shown in FIG. 2 may not have write or upload capabilities. Herein, it is contemplated that the redemption and distribution scheme follow the operations set forth in blocks 400–420. A few targeted coupons for a particular customer may be selected by the distribution software in real-time while the registered customer is waiting at the check out lane or at any prior time and saved in registered customer's account. The selected coupons may be saved in customer's account in the database server and downloaded to an applicable in-store server (block 450).

When the portable scanner is connected to the PSS, all coupons scanned and saved in the portable scanner by the customer will be downloaded from the portable scanner to the respective registered customer's account within the in-store server and/or database server (block 455). The in-store server will communicate with the central server periodically and update the account activity of the registered customer, including redeemed and unused coupons in each registered customer's account (block 455).

The central server will communicate with all in-store servers across the PSS of FIG. 2, so that the in-store network within that geographic region will be updated for the account activity of that registered customer. This will enable the registered customers to visit any store within that region that has deployed the portable scanner system and to redeem unused electronic coupons available in their account. This will also enable the in-store server in each retail store to monitor coupon redemption activity by each registered customer and enforce the pre-set rules of redemption.

In addition, targeted coupon promotions selected by distribution software will be uploaded into registered customer's account within the in-store server for future use. Whenever the portable scanner is connected at checkout or when a registered customer is identified through other means, redemption and distribution software will access the customer's account for applicable coupons saved in their account during their prior visits. The customer will receive these targeted coupon offers saved in their account as surprise credits for participating in the PSS 200.

Figure 10:
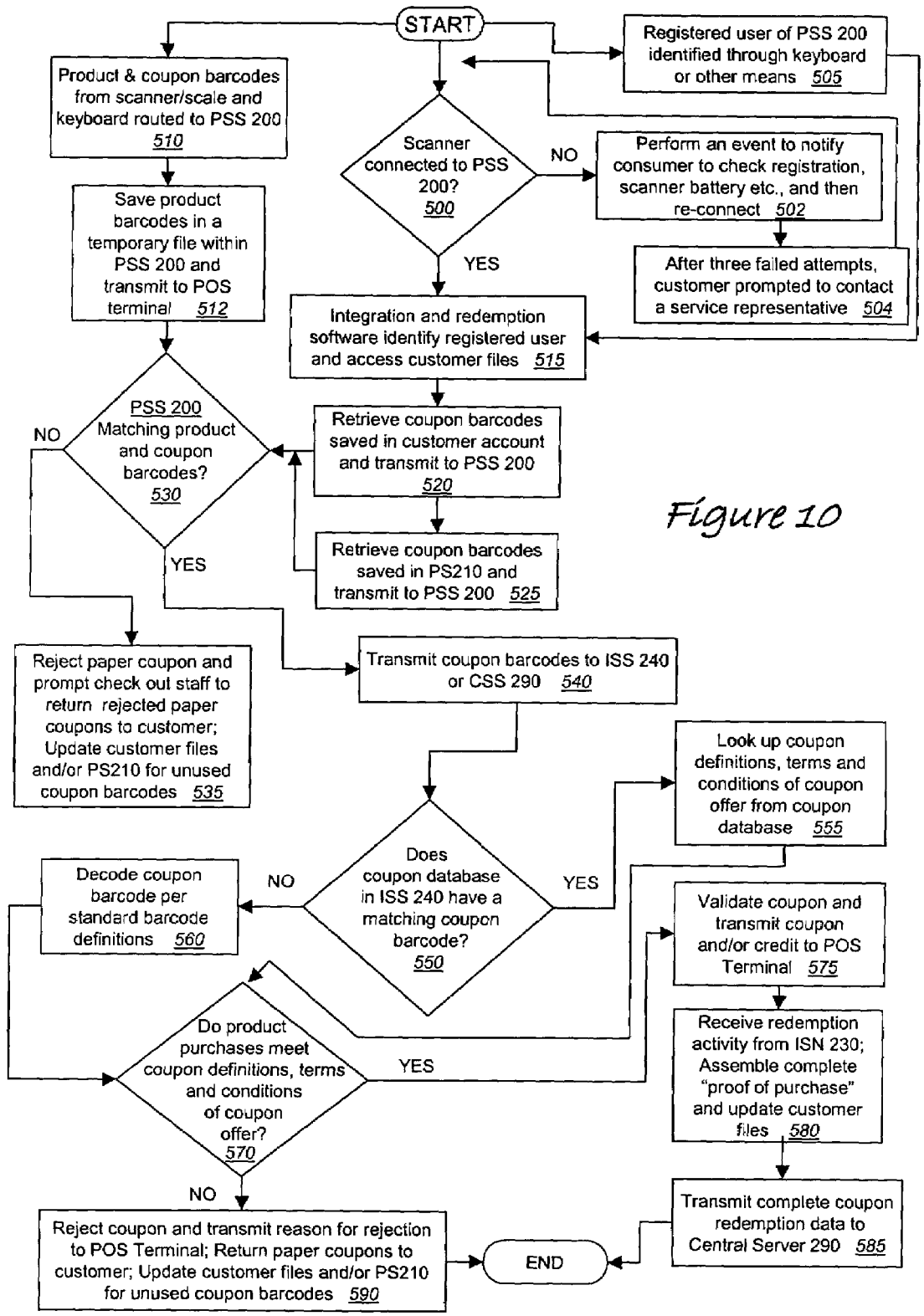
FIG. 10 is an exemplary embodiment of the electronic coupon redemption process supported by the coupon system of FIG. 2.

Referring to FIGS. 2 and 10, an exemplary embodiment of the electronic coupon redemption process supported by the PSS 200 of FIG. 2 is shown. In one embodiment, integration software is stored in DCM 225, kiosk 250, in-store server (ISS) 240 or the POS system while the redemption software is stored at in-store server 240 or central server (CSS) 290. The "integration software" is configured to read coupons stored in internal memory (e.g., data storage groupings 327 and 328 of FIGS. 3–4) of portable scanner (PS) 210. The "redemption software independently verifies that the coupons presented are valid and the customer's product purchases meet the terms and conditions of coupon offer and validates a coupon. Collectively, the integration software and the redemption software are referred to as "integration and redemption software" or "I/R software".

Herein, as one embodiment, the I/R software is configured to read and compare a CBC from a) portable scanner 210, b) coupons entered manually through POS keyboard 218, and/or c) the paper coupons scanned through store scanner/scale 215, with any one of the following: (i) PBC 211 scanned through store scanner/scale 215; or (ii) detailed coupon information stored in in-store server 240 or central server 290.

For this embodiment, when scanner 210 is connected to either docking station 220 or kiosk 250, but the PSS 200 is unable to read information or identify portable scanner 210, the PSS 200 will perform an event such as produce an audible tone, flash LED indicator, etc., and will prompt the customer to check the scanner battery, registration information and re-connect. After three failed attempts, the PSS 200 will prompt the customer to contact a service representative (blocks 502 and 504).

When portable scanner 210 is properly connected and a communication between scanner 210 and the PSS 200 is established, the I/R software will first identify the registered customer and access their customer files (blocks 500 & 515). Even if a registered customer of the PSS 200 is identified through other means (such as their phone number or last name entered through a key board or swiping a loyalty card etc.), the I/R software will identify registered customer and access their customer files (blocks 505 & 515). The I/R software will retrieve CBCs saved in customer account within in-store server 240 or DBS 265 and transmit the barcodes to either DCM 220, POS terminal 235, in-store server 240 or central server 290 (block 520).

The integration software will read and retrieve barcodes stored in the internal memory of the portable scanner 210 and transmit to either DCM 220, POS terminal 235, in-store server 240 or central server 290. With respect to the scanner embodiments of FIGS. 3 and 4, barcode information from the second and third data storage groupings 327 and 328 is retrieved and transmitted to redemption software loaded onto one of the components of the PSS 200 (block 525).

First, the I/R software saves the PBC received from store scanner/scale 215 and POS keyboard 218 in a temporary file and transmits the PBC to POS terminal 235. The I/R software compares the manufacturer codes within the PBC and CBC to find a match (block 530). If there is no matching manufacturer codes, the I/R software will reject the coupon and prompt the check-out clerk to return rejected paper coupons to the customer. The I/R software will update customer files within in-store server 240 and DBS 265 for unused coupons. If portable scanner 210 has write/upload capability, the I/R software will save unused coupons onto internal memory groupings 326 and 327 of portable scanner 210 (block 535).

If there is matching manufacturer codes, integration software will transmit the matched CBC to in-store server 240 or central server 290 (block 540). The I/R software will look up the detailed coupon database to find a match. To speed up the look-up and matching process, the software will first look for the manufacturer code within the coupon database and then compare all coupons offered by that manufacturer (block 550). If there is a matching coupon, redemption software will look up the detailed coupon definitions, rules of redemption, table of products applicable for that coupon, terms and conditions of coupon offer (block 555).

If there is no matching coupon in coupon database, then redemption software will decode the CBC per standard barcode definitions, as shown in FIG. 1 (block 560). The I/R software will compare the PBC saved in temporary file to the rules of redemption as defined in coupon database or as decoded from the CBC, to determine if customer's product purchases meet the terms and conditions of coupon offer (block 570).

If product purchases meet the terms and conditions of coupon offer, the I/R software will validate the coupon and transmit the validated CBC and/or appropriate credit to POS terminal 235 (block 575). The I/R software will receive actual redemption activity from POS terminal 235 or in-store network (ISN) 230 after completion of customer transaction and assemble "complete proof of purchase". The I/R software will update customer files in in-store server 240 and central server 290 for actual redemption data and proof of purchase (blocks 580 & 585).

If product purchases do not meet the terms and conditions of coupon offer, coupon will be rejected and the reasons for rejection will be sent to POS terminal 235. The I/R software will prompt the check-out clerk to return rejected paper coupons to the customer. The I/R software will update customer files and/or portable scanner 210 for unused CBC (block 590).

Multiple configurations and flow of information can be easily designed for real-time validation and redemption of coupons using the POS system, the in-store server and central server. For this embodiment of the invention, all barcodes scanned and saved in the portable scanner are read by the integration software through the portable scanner and retail store docking station. These read barcodes are transmitted to in-store server 240 either through POS terminal 235 or DCM 225. Similarly, all barcodes read by store scanner/scale 215 from paper coupons (e.g., CBC 212) and product purchases (e.g., PBC 211) are also routed to in-store server 240 either through POS terminal 235 or DCM 225. Also, all manually entered data through POS keyboard 218 from paper coupons (e.g., CBC 212) and product purchases (e.g., PBC 211) are also routed to in-store server 240 either through POS terminal 235 or DCM 225.

If PBC 211 is routed to in-store server 240 through DCM 225, PBC 211 may be saved in a temporary file within DCM 225 and immediately transmitted to the POS system for further processing. Comparison and matching algorithms and logic of the I/R software may be loaded in DCM 225 to compare CBC 211 to PBC 212 and if it finds a match, transmits matched CBC to in-store server 240.

Alternatively, comparison and matching algorithms and logic may reside in in-store server 240. In general, the I/R software only compares the manufacturer code of FIG. 1 from PBC 211 and CBC 212 to find a match. In-store server 240 maintains a detailed database of coupon promotions offered by manufacturers and retailers that are currently active in the market for that specified region. The detailed coupon promotional information may include the complete coupon barcode (as shown in FIG. 1), including personalized coupon offer codes, as shown in an electronic coupon or printed in a Free Standing Insert (FSI), face value of coupon, expiration date, terms and conditions of coupon offer such as limit two per purchase, five per family etc., and any other terms and conditions printed on the coupon but may not be reflected on the barcode.

The redemption software looks up the detailed coupon promotional information from in-store server 240 or central server 290, compares product purchases, verifies that the customer's product purchases met the terms of coupon offer and validates the coupon. Thereafter, the I/R software transmits coupon redemption data to the POS system for validation and issuance of credit.

Multiple methods, logic and alternate information flow can easily be developed within the software program for comparing CBC and PBC, verifying that the coupon presented is a valid coupon and the customers' product purchases meet the terms and conditions of coupon offer. Given here is an illustrative embodiment of the coupon validation and redemption process.

The I/R software receives a CBC either from a paper coupon or an electronic coupon. The I/R software looks up the database of CBC stored in in-store server 240, for example, to find a matching coupon barcode. If the I/R software finds a match, then it looks up the complete coupon definition stored in the database. The "complete" coupon definition includes the manufacturer code, family code, value code, offer code, expiration code, household code (if any) and any other terms and conditions of the coupon typically not included in the CBC, but printed on the FSI and/or maintained in in-store server 240 such as limit two per purchase, five per family etc. This detailed database may list every coupon offered by participating manufacturer and retailer and the corresponding list of products that are applicable for that particular coupon. The applicable products for a coupon include complete PBC including manufacturer codes and item codes. The I/R software verifies that the PBC from customer purchases match the applicable PBC for the corresponding coupon. This also allows the manufacturers to offer cross promotions.

For instance, as an illustrative example, a retailer and/or multiple manufacturers can join together and offer a coupon as follows: $4.00 off when you buy the following: a) one packet of one dozen XYZ hot dog buns; b) one bottle of ABC 12 oz mustard; and c) one dozen XXX brand hot dogs. The I/R software makes sure the customers' product purchases meet the terms and conditions of coupon offer and validates the coupon.

In addition, in-store server 240 keeps a table of purchases for the current customer that is used to ensure sufficient products are purchased by the customer to redeem the coupons. In-store server 240 also processes the coupons it receives for that customer. First, each coupon is matched against the in-store server's current database of coupon definitions using a database key that comprises manufacturer code, family code, value code and offer code. The coupon definition includes the complete CBC as shown in an electronic coupon or printed in a Free Standing Insert (FSI), face value of coupon, expiration date, terms and conditions of coupon offer such as limit two per purchase, five per family etc., and any other terms and conditions printed on the coupon. Based on the coupon definition in the database, the coupon is verified to be in effect, not expired, and valid for the store and/or region.

In addition, DBS 265 and in-store server 240 also maintain some or all of the following information: a) specific geographic regions, such as zip codes, city, county or states where the coupon is valid; b) customer redemption limit during each visit (such as limit one coupon per customer); c) total customer redemption limit over a specific time period or during the term of the campaign (such as limit five per customer over 30 days) etc., and c) total promotion limit specified by the manufacturer for the duration of the campaign. For example, a manufacturer may drop 10 million coupons on Apr. 1, 2003 in print media in a specified geographic region with an objective of redeeming 300,000 coupons within 60 days and print an expiration date of May 31, 2003 on the coupon. On May 31, 2003, if the total redemption for this coupon is only 250,000, the PSS 200 has the ability to continue redeeming the coupon until the manufacturer reaches their target redemption limit of 300,000 coupons, even though the expiration date printed on the coupon has expired.

If the coupon is valid, the redemption rules for the coupon are used to ensure that the customer has redemptions remaining for the coupon and that the customer has purchased sufficient products per terms of the offer such as buy two get one free. If the product purchases satisfy the redemption rules and meet the terms of coupon definitions, the I/R software validates the coupon. At that point, the validated CBC or a credit for the coupon is routed to the appropriate POS terminal and a detailed transaction record on the redemption is written to a local file within in-store server 240 for transmission back to central server 290 during next transmission link.

Hence, the coupons are independently verified and validated. Although a customer can scan a CBC multiple times, the I/R software will only redeem the coupon based on manufacturer/retailer instructions. In other words, if the coupon condition states "limit two per purchase or limit five per family", I/R software will limit redemption of both paper and electronic coupons to pre-set redemption limits. Accordingly, if a registered customer of the PSS 200 redeems either a paper or electronic coupon at any retail store that has deployed PSS 200, in-store server 240 and/or central server 290 will limit the customer to pre-set redemption limits per instructions received from coupon issuer.

For any coupons rejected, abbreviated messages are sent to the appropriate POS terminal 235 to display on the terminal and also printed on register receipt. A list of rejection codes and the corresponding abbreviations and explanations will be maintained within in-store server 240 and central server 290. Detailed transaction record explaining the reason for rejection are written to a local file within in-store server 240 for transmission back to central server 290 during next transmission link.

If no match is found for a CBC in the database of coupon definitions of the in-store server, standard rules of barcode are used to decode and interpret the CBC itself; i.e., the expiration code is used to verify the coupon has not yet expired, the manufacturer's ID is used to match product purchases to coupon, and the value code is used to provide a face value for the coupon and identify multiple purchase requirements. As a last resort, the operator at the POS terminal may press an override key to force the redemption of any coupon. Of course, the detailed transaction record for the redemption will indicate that the coupon was redeemed using "manual override" feature.

The I/R software transmits the complete CBC validated by the I/R software to the POS system or POS terminal 235 for further processing. The POS system may issue additional credits to customer based on double manufacturers coupons offered by retailers or any other retail store promotions being offered. Alternatively, it is contemplated that the I/R software may issue a credit to the POS system in lieu of transmitting validated CBC to the POS system for processing, as explained above. The in-store server 240 may interface and communicate with in-store network 230 and receive the complete coupon transaction records from in-store network 230 upon completion of the customer's transaction to ensure that the in-store server has complete and final coupon redemption activity as processed by POS terminal 235.

The I/R software will generate from in-store server 240 and in-store network 230 a detailed "proof of purchase" for every coupon redemption transaction which may include some or all of the following: date stamp, time stamp, retail store location, POS terminal location, product(s) purchased for every coupon redeemed, original selling price of product (s) per POS system, face value of coupon redeemed, additional discounts offered by retailer's POS system 230 such as double manufacturer's coupons, net price paid by the customer and the customer who redeemed the coupons. The I/R software will transmit coupon redemption data along with "proof of purchase" to central server 290 either in real time or on a periodic basis.

Figure 11:
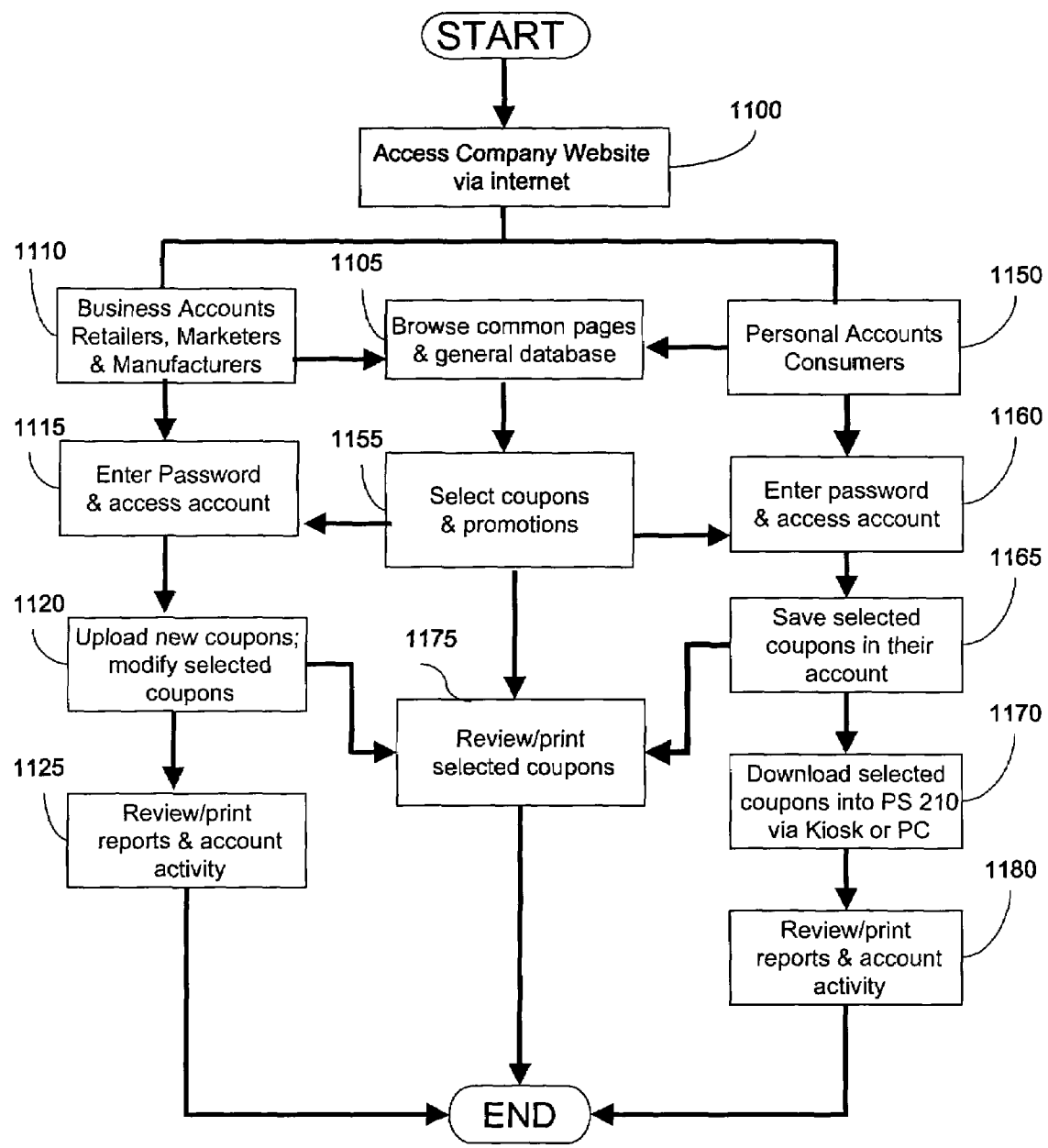
FIG. 11 is an exemplary embodiment of the functionality supported by a website accessible by registered customers featuring coupons and promotions supplied by manufacturers, retailers and marketers.

Referring now to FIG. 11, an exemplary embodiment of the functionality supported by a website that is accessible by registered customers and features coupons and promotions supplied by businesses is shown. The website allows businesses, such as manufacturers, retailers and marketers for example, to specifically target customers at the individual demographic level.

As shown, manufacturers, retailers and marketers can access website via Internet, browse common pages and general database and select coupons of their choice (blocks 1100, 1105 and 1155). Business accounts can enter their assigned passwords to access their accounts (blocks 1110 & 1115), upload new coupon information, including their barcodes, review/modify selected coupons (block 1120) and review/print reports (block 1125).

The website also enables registered customers to review their accounts, items purchased with coupons, and the savings generated over a period of time by using the scanner. Programs can be developed to periodically select a few custom coupons based on their profile, demographics and transaction history and upload these coupons into their individual website account. Customers can browse the database sorted by manufacturers and category of products (block 1105), select any coupons of their choice (block 1155), enter their password and access their account (block 1160), save selected coupons in their account (block 1165), download selected coupons into PS 210 via kiosk or PC (block 1170) and review/print coupons, reports and their account activity (blocks 1175 & 1180).

Referring back to FIG. 2, an exemplary embodiment of the functionality supported by the electronic coupon clearing process supported by the PSS 200 of FIG. 2 is shown. The redemption and clearing software is designed to capture CBC from both paper and electronic coupons at the POS system and clear them electronically at the POS system with no need for further handling. Redemption reports generated from central server 290 provide detailed coupon redemption data including date and time stamp, store number and aisle location, product purchased for every coupon redeemed, customer ID, manufacturer code, family code, coupon campaign code, zip code, region etc. Such detailed electronic proof of purchase eliminates the need for manual coupon counting, inspection and review process.

The coupon processing system is scalable and capable of processing large volumes of data. Several regional servers may be established to assist in communications between central server 290 and in-store server 240. The location and the number of regional servers depend on volume and growth needs. Central server 290 can generate any kind of standard or custom reports as requested by manufacturers, retailers and marketers.

The coupon clearing process is nothing but the settlement of account activity between manufacturers and retailers showing the face value of coupons redeemed by customers, coupon handling & processing fees and the net amount owed by manufacturers to retailers. Central server 290 can generate settlement reports in various formats such as ASCII, Excel etc. or in any other format of manufacturers & retailers choice. These reports can further be designed to upload directly into various accounting software packages.

For one embodiment, the settlement reports generated for each manufacturer and/or coupon provider is expected to show some or all of the following information: (a) face value of paper & electronic coupons redeemed, sorted by product, product line, retail store, zip code, region, coupon campaign code (if any) etc.; (b) electronic coupons distributed, electronic coupons redeemed and electronic coupon redemption fee; (c) coupon handling, processing and other clearing fees; (d) the net amount owed by manufacturer to retailer; and (e) detailed proof of purchase including date and time stamp, store location, aisle location, product(s) purchased for the coupon, product selling price per POS, face value of coupon, additional discounts offered by retailer and the net amount paid by customer; (f) customer ID number, unique Portable Scanner ID number, customer name, address, phone number and further information as to who redeemed the coupon. Since all coupon redemption, clearing and account settlement information will be available in electronic format to both retailers and manufacturers in real time, retailers have the ability to deduct coupon receivable from their accounts payable to manufacturers, thereby reducing the collection cycle to real time.

In addition, an exemplary embodiment of the process of using portable scanner 210 of FIG. 2 for customer identification and communication at POS terminal, kiosk and Internet is described herein. As shown in FIG. 2, portable scanner 210 has a unique ID number and is assigned to a registered customer. When a customer registers to participate in the PSS 200 being deployed, the customer is requested to fill out an application/registration form which may request the customer to provide some or all of the following information: full name, date of birth, social security number, driver's license number, at least one major charge card, address and phone number, number of people in their household and their names and dates of birth, combined annual household income in broad categories, number and types of pets in their household, etc. Alternatively, the customer may enter the application/registration information directly at the kiosk 250 or through the web server 270 on the Internet.

The customer profile and demographic information from the application/registration forms are entered into DMC 275, which updates DBS 265 and downloads to all applicable in-store servers 240 across the PSS 200.

When the customer docks portable scanner 210 at a POS terminal 235 through docking station 220, at a kiosk 250 or logs on to web server 270 through their personal computer 280, central server 290 and/or in-store server 240 identifies the customer through the unique ID number of portable scanner 210 being an alphanumeric number and looks up their registration information maintained in DBS 265 or in-store server 240. A registered customer of portable scanner 210 will also be identified by in-store server 240 when customer information such as first or last name, phone number, home address, social security or driver's license number is entered through POS keyboard 218 or kiosk 250.

Retail Store Programs such as loyalty cards, club cards, frequent shopper programs, point/purchase based reward programs, store credits, gift cards etc. (hereinafter generally referred to as "RSP") are maintained, monitored and processed either through in-store network 230 or through third party networks (TPN) 248. Retail stores may process a RSP through their in-store server and through TPN 248. An RSP maintains a list of customers participating in each program including their ID number, name, address, phone number, etc. and their transaction history, account activity and balance, if any. Each RSP may maintain and identify a customer through their own unique customer identification number. In effect, a customer may have multiple identification numbers maintained by various RSPs in multiple networks.

The unique ID number of portable scanner 210 can be entered and linked to various RSPs. Similarly, RSP identification numbers for each participant in various programs can be entered and linked to the unique ID number of portable scanner 210. This will enable DBS 265 and in-store server 240 to maintain a table and list of all RSPs participated by each registered customer of portable scanner 210, their respective identification numbers and the address of the TPN 248 that process the RSP transactions.

When a registered customer of portable scanner 210 is identified by in-store server 240 or DBS 265, applicable customer identification information such as unique ID number of portable scanner 210, respective RSP identification number of the customer, customer name, phone number or the like will be routed to appropriate TPN 248 or in-store network 230 for further processing of RSP transactions.

TPN 248 and/or in-store network 230 identify the customer, process the RSP transactions and transmit the customer account activity and/or account balance, if any, to in-store server 240 or DBS 265. In-store server 240 or DBS 265 may update the customer files and upload applicable RSP account activity and/or account balance into PS 210 through established communication link.

As an illustrative example, retail store ABC has a frequent shopper program monitored and processed through a TPN 248. TPN 248 communicates with in-store server 230. Retail store ABC gives a store credit of $10 for every $100 of products or services purchased by a customer participating in their frequent shopper program. The store credit rewarded under this frequent shopper program expires in 90 days from the date of reward.

Customer XYZ participated in retail store ABC's frequent shopper program. Customer XYZ purchased $180 worth of products and the customer activity was transmitted by in-store network 230 to TPN 248. The frequent shopper program activity was processed by TPN 248 and the customer was rewarded $10 of store credit based on customer purchases. Frequent shopper program activity and/or account balance will be transmitted from in-store network 230 and/or TPN 248 to in-store server 240. In-store server 240 will upload the $10 store credit and expiration date into first storage grouping 336 of portable scanner 210. In-store server 240 may also upload the account activity and inform the customer that s/he has purchased a total of $180 from their store and an additional purchase of $20 will earn them an additional $10 store credit.

As another illustrative example, retail store XYZ and customer A participate in the PSS 200 being deployed. Customer B purchased a $20 Gift Card from retail store XYZ and gave it as a gift to customer A. When customer A connects portable scanner 210 at a POS terminal 235 and swipes the $20 gift card at a check out lane during his/her next visit to retail store XYZ, in-store network 230 will read and process the gift card information or transmit the gift card information to appropriate TPN 248 for processing gift card transaction. In-store network 240 will receive gift card activity and balance, if any, from in-store network 230 or TPN 248 and upload the information to portable scanner 210 through established communication link. Portable scanner 210 will save the gift card activity and balance, if any, in appropriate RSP storage grouping for retail store XYZ. During subsequent visits to retail store XYZ, customer A can either bring the gift card or PS 210 to redeem the unused gift card value.

As shown in FIGS. 3 and 4, all RSP information of each retail store/chain participating in front-end processing system 205 being deployed will be saved in portable scanner 210 under separate data storage grouping, such as 336, 337, etc. All RSP information and files saved within each storage grouping can only be accessed and modified by in-store server 240 or kiosk 250 of the respective store or chain of stores.

In other words, RSP information of retail store A saved within storage grouping 336 of portable scanner 210 can not be accessed or modified by in-store server 240 or kiosk 250 of retail store B. Customer access to RSP information is "read only". Customers can review and read all RSP information saved in all storage groupings through a computer 280 or kiosk 250 as shown in FIG. 2, but the customer can not add, change or delete any RSP information saved within these data storage groupings of portable scanner 210.

Under the current system, in-store network 230 identifies their customers through magnetic media or barcode in a plastic card issued to their customers or by entering customer name, phone number, address etc., via keyboard. In-store network 230 identifies the customer and accesses the appropriate RSP information stored in its network 230 or transmits appropriate customer identification information to TPN 248 to process RSP transactions. Since portable scanner 210 enables in-store server 240, DBS 265, in-store network 230 and TPN 248 processing RSP's to identify store customers, customers participating in the PSS 200 being deployed do not have to use both portable scanner 210 and plastic cards issued by RSP's. In effect, a registered customer of portable scanner 210 who participates in one or more RSPs will be identified by the PSS 200 and by RSPs either through portable scanner 210 or through plastic cards or through customer name, address, phone number etc.

Figure 12:
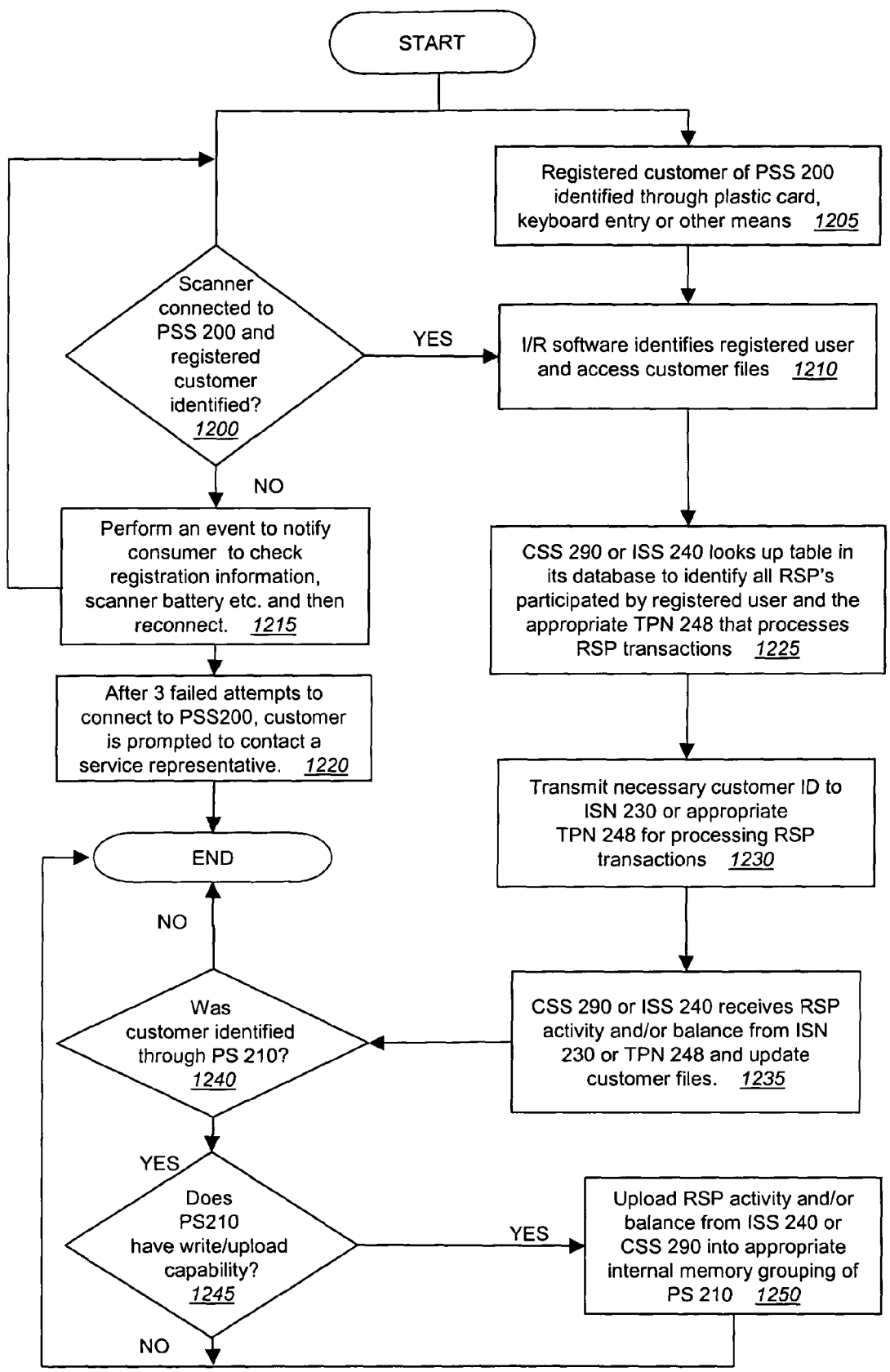
FIG. 12 is an exemplary embodiment of the process of using a portable scanning device of FIG. 2 for customer identification and communication at a POS, kiosk or computer.

Referring now to FIGS. 2 and 12, an exemplary embodiment of the process of using portable scanner 210 of FIG. 2 for customer identification and communication at POS terminal 235, kiosk 250 and the Internet is shown. A registered customer establishes communication link with the PSS 200 by docking portable scanner (PS) 210 at a docking station 220 at POS terminal 235, kiosk 250 or computer 280 (block 1200).

Alternatively, if a registered customer is identified through plastic card, keyboard entry or other means, the customer identification information will be transmitted to the PSS 200 (block 1205). Regardless of whether the customer was identified through portable scanner 210 or other means, central server (CSS) 290, in-store network (ISN) 230 or in-store server (ISS) 240 will identify the customer and access customer files (block 1210).

Central server 290 or in-store server 240 will look up the table in its database to identify all RSP's participated by registered customer and the addresses of the TPN 248 processing the respective RSP's (block 1225). Central server 290 or in-store server 240 will transmit all applicable customer identification information such as unique ID number of portable scanner 210, RSP identification number, if any, customer name, address etc., to ISN 230 or TPN 248 for processing RSP transactions (block 1230).

If RSP is processed by a TPN 248, either in-store network 230, in-store server 240 or central server 290 may transmit transaction details to TPN 248 for processing RSP transactions. Central server 290 or in-store server 240 will receive RSP account activity and/or account balance from in-store network 230 or TPN 248 and update customer files maintained in its database (block 1235).

If customer was identified through portable scanner 210 and scanner 210 has write/upload capability, central server 290 or in-store server 240 will upload RSP account activity and/or account balance into the appropriate memory grouping of portable scanner 210 via established communication link (blocks 1240 & 1245). If the customer was identified through plastic card, keyboard entry or other means, then in-store server 240 or database server (DBS) 265 will just update customer files within its database for RSP activity, transactions and balances.

DBS 265 maintains a list of retail stores/chains participating in the system being deployed including all detailed information about each retail store such as store name, address, contact information, types of accounting and settlement reports requested by the store, store locations and ID numbers, types of RSPs offered by the store, RSPs processed by retail store servers, RSPs processed by TPN 248 and their network addresses etc. A customer may participate in various RSP's of multiple retail stores.

For example, a customer may participate in loyalty card program offered by retail store A, frequent shopper program of store B and in both programs offered by store C. Central server 290 and DBS 265 will only download the applicable and appropriate registered customer information and the various RSPs participated by the portable scanner 210 to respective in-store server 240 periodically or even in real time. Since there is only one unique ID number for each portable scanner 210, identification of customer and the RSPs participated by a customer in each retail store location is a fairly simple process. In effect, portable scanner 210 will enable customer identification and communication in real time and has the ability to combine RSP's of various retail stores into one digital communication device.

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. Adapted to a portable scanner system supporting electronic coupon validation and redemption, a portable scanner comprising:
    a communication port;
    an optical converter;
    a processing unit in communication with the optical converter and the communication port; and
    an internal memory coupled to the processing unit, the internal memory comprises a plurality of data storage groupings including (1) a first data storage grouping being a list of coupons, inaccessible for redemption, that are currently available for a particular geographic region, and (2) a second data storage grouping being a list of coupons, accessible for redemption, that were scanned and matched with a coupon of the first data storage grouping.

2. The portable scanner of claim 1, wherein the internal memory further comprises a third data storage grouping including a list of coupons, accessible for redemption, that were scanned and unmatched with a coupon of the first data storage grouping.

3. The portable scanner of claim 2, wherein the internal memory further comprises a fourth data storage grouping being configured to store a manufacturer code for each manufacturer participating in the portable scanner system.

4. The portable scanner of claim 1 further comprising a display to illustrate coupon descriptive information being alphanumeric characters to identify at least one of the following: a value of a coupon, expiration date of a coupon, a description of a discounted product, and a description of a manufacturer of the discounted product.

5. The portable scanner of claim 4 further comprising an interface to enable a customer to control operations of the scanner, the interface comprises (i) at least one scroll key that, when depressed, enables a customer to scroll and review alphanumeric characters on the display, and (ii) a scan key that, when depressed, activates the optical converter to scan a data object.

6. The system of claim 5, wherein the internal memory further contains a unique identification number to enable identification of scanner and the customer.

* * * * *